(12) United States Patent
Vallittu

(10) Patent No.: US 12,384,100 B2
(45) Date of Patent: Aug. 12, 2025

(54) METHOD AND SYSTEM FOR PRODUCING A PRINTABLE OBJECT

(71) Applicant: Rayo 3D Biotech Oy, Kalkkiranta (FI)

(72) Inventor: Pekka Vallittu, Kuusisto (FI)

(73) Assignee: Rayo 3D Biotech Oy, Kalkkiranta (FI)

( * ) Notice: Subject to any disclaimer, the term of this patent is extended or adjusted under 35 U.S.C. 154(b) by 0 days.

(21) Appl. No.: 18/549,544

(22) PCT Filed: Nov. 30, 2022

(86) PCT No.: PCT/EP2022/083848
§ 371 (c)(1),
(2) Date: Sep. 7, 2023

(87) PCT Pub. No.: WO2023/217404
PCT Pub. Date: Nov. 16, 2023

(65) Prior Publication Data
US 2025/0026073 A1    Jan. 23, 2025

(30) Foreign Application Priority Data
May 12, 2022 (WO) ................ PCT/EP2022/062888

(51) Int. Cl.
*B29C 64/106* (2017.01)
*B29C 64/277* (2017.01)
(Continued)

(52) U.S. Cl.
CPC .......... *B29C 64/106* (2017.08); *B29C 64/277* (2017.08); *B29C 64/40* (2017.08); *B33Y 10/00* (2014.12); *B33Y 70/00* (2014.12)

(58) Field of Classification Search
None
See application file for complete search history.

(56) References Cited

U.S. PATENT DOCUMENTS

| | | | |
|---|---|---|---|
| 2018/0169968 A1 | 6/2018 | Yearwood | |
| 2019/0275746 A1* | 9/2019 | Huang | B29C 64/112 |
| 2019/0291350 A1* | 9/2019 | Feinberg | A61L 27/443 |

FOREIGN PATENT DOCUMENTS

| | | | |
|---|---|---|---|
| CN | 2120603 423 U | * | 2/2021 |
| CN | 212603423 U | | 2/2021 |

(Continued)

OTHER PUBLICATIONS

International Search Report and Written Opinion of the ISA for PCT/EP2022/062888 mailed Dec. 13, 2022, 13 pages.

(Continued)

Primary Examiner — Mohammad M Ameen
(74) Attorney, Agent, or Firm — Nixon & Vanderhye PC

(57) ABSTRACT

Disclosed is a method for producing a printable object, the method comprising: injecting printing material using a printing element having a printing tip that is movable, into supporting material, wherein the supporting material comprises initiator that is free radical polymerization initiator compatible to enhance curing of the printing material while not causing polymerization of the supporting material, and curing the injected printing material using at least one light emitting source providing light that causes polymerization of the printing material, wherein the curing is performed simultaneously with the injecting of the printing material.

14 Claims, 6 Drawing Sheets

(51) Int. Cl.
    *B29C 64/40*        (2017.01)
    *B33Y 10/00*        (2015.01)
    *B33Y 70/00*        (2020.01)

(56) References Cited

FOREIGN PATENT DOCUMENTS

| | | |
|---|---|---|
| JP | 2015-189930 | 11/2015 |
| JP | 2017-533585 | 11/2017 |
| JP | 2018-051970 | 4/2018 |
| WO | 2020/008788 | 1/2020 |
| WO | 2021041372 A1 | 3/2021 |

OTHER PUBLICATIONS

International Search Report and Written Opinion of the ISA for PCT/EP2022/083848 mailed Feb. 13, 2023, 14 pages.
Nov. 19, 2024 Office Action issued in Japanese Patent Application No. 2023-555462, pp. 1-2 [machine translation included].

\* cited by examiner

METHOD AND SYSTEM FOR PRODUCING A PRINTABLE OBJECT

CROSS-REFERENCE TO RELATED APPLICATIONS

This application is the U.S. national phase of International Application No. PCT/EP2022/083848 filed Nov. 30, 2022, which designated the U.S. and claims priority to PCT/EP2022/062888 filed May 12, 2022, the entire contents of each of which are hereby incorporated by reference.

FIELD

The present disclosure relates to producing an object that is produced using additive manufacturing.

BACKGROUND

There is a need to utilize modern techniques like 3D printing, in fabrication of tissue engineering scaffolds, implantable or per os delivered drug releasing dossiers, soft and hard tissue replacing reconstructions. Among many techniques tissue engineering and additive manufacturing (AM) techniques have recently been tested for manufacturing hard tissue reconstruction devices and tissue engineering scaffolds which are either biostable, biodegradable or partially biodegradable up to the indication they are used. Some criteria of a scaffold include for example biocompatibility, adequate mechanical strength, biodegradability or biostability, and sufficient porosity. Biocompatibility of a scaffold may be defined as its ability to support normal cellular activity, including molecular signalling systems, without any local and systemic toxic effects to the host tissue. Furthermore, the hard tissue replacing device or biostable scaffold should withstand loads of the physiologic function in long term. For implantable constructs and dental constructs, the requirements may comprise for example non-toxicity, non-allergenicity, antimicrobicity, sufficient strength, wear resistance and surface texture (implants) and gloss (dental constructs).

BRIEF DESCRIPTION

The scope of protection sought for various embodiments of the invention is set out by the independent claims. The exemplary embodiments and features, if any, described in this specification that do not fall under the scope of the independent claims are to be interpreted as examples useful for understanding various embodiments of the invention.

According to a first aspect there is a method for producing a printable object, the method comprising: injecting printing material using a printing element having one or several printing heads that are movable, into supporting material, wherein the supporting material comprises initiator that is free radical polymerization initiator compatible to enhance curing of the printing material while not causing polymerization of the supporting material, and activation on the supporting material with curing the injected printing material in the steps of the printing process using at least one light emitting source providing light that causes polymerization of the printing material and activation of the initiator in the supporting material. It is to be noted that the supporting material comprises initiating additive(s), in other words, the initiator(s), which may also be understood to be an initiator system comprised in the supporting material.

In an example embodiment according to the first aspect, the method may comprise a resin injection bioprinting, using extrusion 3D printer, having an injection tip or printing surface platform moving in x-y-z directions and simultaneously injecting and curing the material layer-by-layer for the object to biocompatible hydrogel support.

In an example embodiment according to the first aspect, quantity of the supporting material is increased i.e. a printing well that comprises the supporting material is filled while the printing head moves in vertically (y-direction) for allowing the printing to occur in the supporting material.

In an example embodiment according to the first aspect the supporting material which is filling the printing well during the vertical movement of the printing head is activated by UV radiation, microwaves or heat the tube before sprueing to the well of the supporting material.

In an example embodiment according to the first aspect, there, as the supporting material, is a biocompatible, non-solid supporting and oxygen inhibition of the free radical polymerization or frontal polymerization eliminating supporting material into which the printing material is injected and polymerized in the way that printing layers will adhere to each other via polymerization reaction of the injected material.

In an example embodiment according to the first aspect, in the supporting material there are additives of free radical polymerization or frontal polymerization initiators compatible to accelerate curing of the injectable material but not causing curing of the supporting material.

In an example embodiment according to the first aspect, the supporting material comprises protective gas for ensuring polymerization of the of the printing material to occur with formation of the oxygen inhibited surface layer to the printing object. The protective gas may also be called as protection gas.

In an example embodiment according to the first aspect, the protective gas protects the formed free radicals to oxide and thus prolongs their life time.

In an example embodiment according to the first aspect, the protective gas is formed during activation of the additives in the supporting material for free radical formation.

In an example embodiment according to the first aspect, the printing will take place in the surface layer of the supporting material with highest amount of protective gas and polymerization accelerating free radicals.

In an example embodiment according to the first aspect, the printing material has lower, equal or higher density than the supporting material and up to the difference of densities ($\Delta\rho$) the printed material is sprued into the supporting material or on its surface for benefiting the impact of surface tension to support the printable material considering the effects of surface energies and Archimedes' principle at the temperature of the supporting material.

In an example embodiment according to the first aspect, the supporting material's gel-like composition increases its surface energy and viscosity by intermolecular forces between liquid molecules and the gelling agent molecules and this increases support to the printable material.

In general, the supporting material may be gel or liquid for obtaining support by the increase of surface tension.

In an example embodiment according to the first aspect, the radical polymerization initiator additive of the supporting material can be activated by the same or other wavelengths of light than the polymerizable injected material, by microwaves or by increased temperature.

In an example embodiment according to the first aspect, there are additives of colloidal particles, biologically active molecules, antimicrobial components, drugs, compounds, fillers, or cells in the supporting material to be transferred to the printable object.

In an example embodiment according to the first aspect, the supporting material ensures instant curing of the printable material by help of the initiator of initiator system of the printable material and by this, the printable object can have complicated shapes without having several supports to the printing surface platform.

In an example embodiment according to the first aspect, the method may be performed, at least partly, using a robocasting 3D printer or polyjet printer that has a chamber and injection tip for the printing material which control the viscosity and dispersion of optional fillers and other additives of the printing material via temperature or ultrasound waves.

In an example embodiment according to the first aspect, the method comprises using a computer program to control the printing velocity, printing layer thickness, printing material viscosity and filler dispersion, polymerization light wavelength, power in the printing process, rate of filling the supporting material with activated new supporting material and change of the supporting material during the printing process.

In an example embodiment according to the first aspect, the printable object is initially fixed to the bottom or walls of the supporting material well with the first contact of the printed material. Additionally, or alternatively, the printable object may be fixed to the walls and/or bottom of the well during the printing process.

In an example embodiment according to the first aspect, the method is performed by a system that comprises one or several light emitting units for activating initiators in the supporting material for accelerating the polymerization and for inducing light-initiated polymerization of the printed material, and allowing photopolymerization to take place during or after injecting the printing material to the supporting material for solidification of the printing material and adhering the injected material layers to each other.

In an example embodiment according to the first aspect, the light radiation for initiation and propagation of the polymerization is continuous or pulsatile of one or several wavelengths and it is coming from one or several directions.

In an example embodiment according to the first aspect, the supporting material is non-solid material is high-viscosity liquid or gel with or without solid, semisolid, molecular, ion or cell additives which can be attached inside or surface or both of the printed object.

In an example embodiment according to the first aspect, supporting material protects the printed material from the ambient oxygen whenever it is prone for oxygen inhibition of polymerization.

In an example embodiment according to the first aspect, the supporting material transfers compounds of biological activity like growth factors, antimicrobial compounds, drugs, bioactive fillers, cells or printable sensors to the surface of inner parts of the printable object.

In an example embodiment according to the first aspect, the printed object comprises smart sensors for pressure, temperature, pH, antibody and other immune system monitoring formed from the materials, compounds and systems of the supporting materials.

In an example embodiment according to the first aspect, the supporting material and the printing material can be changed during the printing process which enables printed object to have layer-like structure in terms of printed material, compounds and materials which transferred from the supporting material to the printed object.

According to a second aspect, there is a system comprising a robocasting device that is configured to perform the method according to the first aspect.

According to a third aspect, there is a system comprising a polyjet printer device that means for performing the method according to the first aspect.

DETAILED DESCRIPTION

Figure 1A:
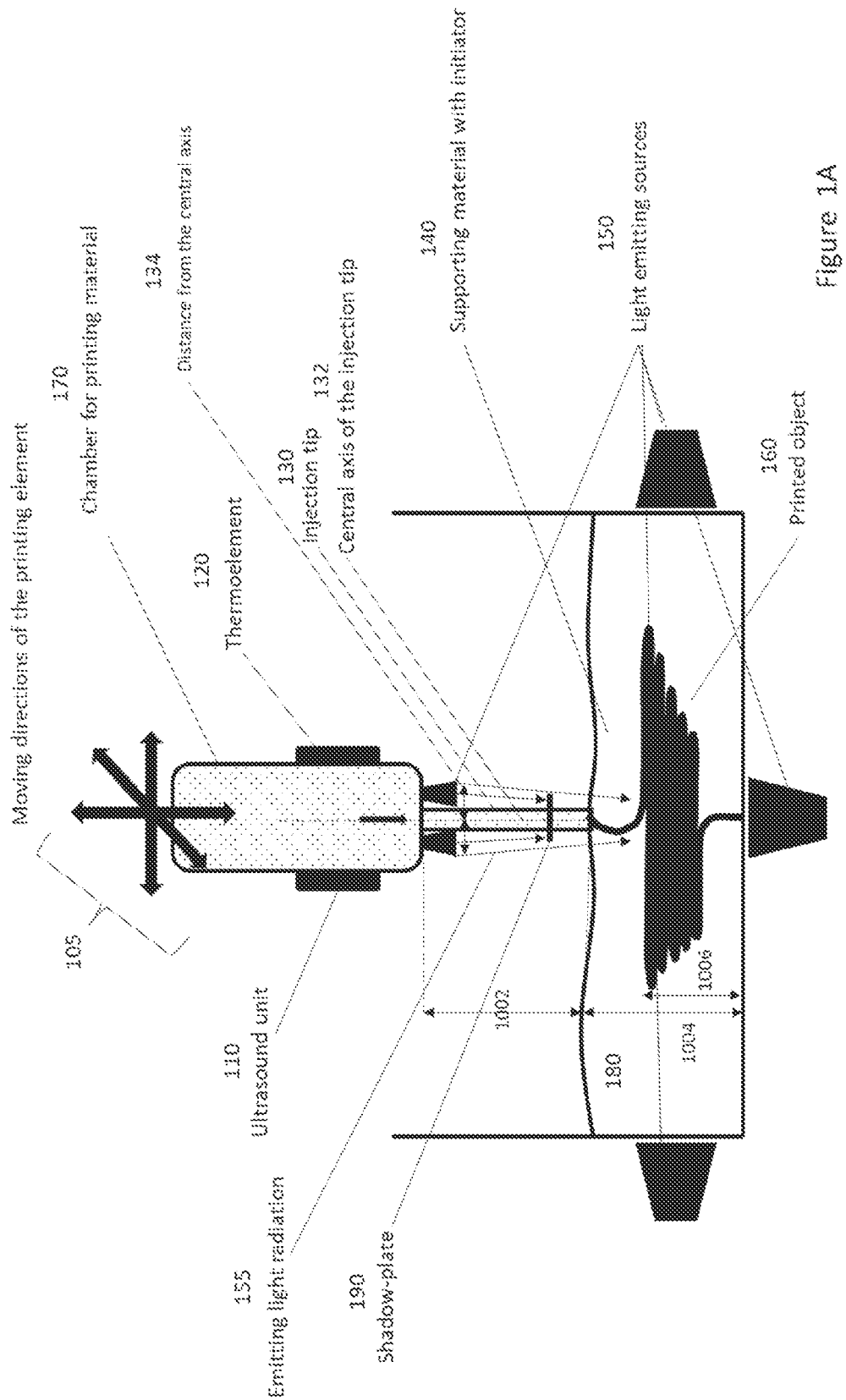
FIG. 1A illustrates a robocasting system and supporting material.

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

One group of materials which has good physical properties and have been employed in additive manufacturing (AM), which may also be understood as 3D printing, and bioprinting are resin-based materials and composites. These materials can also be processed by several kinds of AM techniques. However, there are some limitations in the AM techniques to fabricate complex shaped objects and those which requires good biocompatibility. Also, there are limitations in the present AM techniques to transfer biologically active substances to the AM prepared object.

Another group of material which has a role in bioprinting of tissue engineering scaffolds, drug delivery vehicles, cell encapsulation are hydrogels. A hydrogel is a cross-linked hydrophilic polymer system that does not dissolve in water. Hydrogels posses physiochemical properties that make them suitable for wide range of biomedical applications. Hydrogels are used also as biomaterial in soft tissue augmentation because their highly viscous nature resembles natural soft tissue. In addition, hydrogels can be loaded with biologically active substances and cells. However, their mechanical characteristics may be weak for hard tissue repair and replacement applications.

There are several 3D printing techniques, devices and resins available which are used to fabricate tissue engineering scaffolds, implants, implantable or per os delivered drug releasing dossiers, dental and even living cell constructs. For example, a biostable thermoset monomer system that can be used in implants and dental restorations is based on mono or multifunctional acrylate or methacrylate monomers and filler composites, whereas biodegradable resin-based materials are preferred for tissue engineering scaffolds and drug releasing dossiers. Examples of drugs to be released from the printed object are anti-inflammatory drugs and antibiotics. Monomers hardens in polymerization by free radical polymerization, cationic polymerization, cationic photopolymerization or frontal polymerization which are reactions inhibited e.g. by oxygen, which can be understood as ambient oxygen. For having complete hardening, i.e. degree of cure called and monomer conversion (DC) of the monomers from inner part to the surface, oxygen should not be present in the curing process. Negative effect of ambient oxygen may be hindered for example by using oxygen protective barrier before final curing of the object is performed. A high DC of the monomers may help to achieve benefits such as good mechanical properties, good biocompatibility and high surface gloss when it is desired like in dental constructs. Other methods may also be used to prevent the inhibitory effect of oxygen of light-curing. These are curing the object in a vacuum chamber or in otherwise an oxygen-free atmosphere of inert gas (nitrogen, carbon dioxide, argon, helium).

When producing an object, that is a printable object, using a liquid-based AM process, with stereolithography photocuring resin may be cured layer-by-layer from a liquid bath. It may also be possible to inject the printing material in gas, for example in air, on solid surface and cure it layer-by-layer with light of desired wavelength and irradiation power. For the AM process a system such as a polyjet printing system or a robocasting system which is an extrusion printing system, may be used for the AM process. For example, the robocasting system may be analogous to direct ink printing and other extrusion-based AM printing techniques used in an AM process including bioprinting of cells. If there is not supporting material for the injectable material, which is the printing material, the printable object may be supported using other means such as with several supporting stubs, to obtain the solid surface. Depending on the rheological properties of the printing material, a distance between adjacent stubs may be determined. The stubs may then be removed when the object is finalized. Yet, using stubs may in some examples diminish dimensional accuracy of the object to be produced. As another example, in the polyjet 3D printing a separate supporting material can be printed simultaneously with the printing material. Supporting material will then be an intergrated part of the printable object and needs to be removed afterwards. After removal of the polyjet supporting material, the printed object has a sticky polymerization inhibited, non-gloss and not biocompatible surface due to the printing process which has occurred in ambient air.

An alternative method for printing the material in gas and using several supporting stubs is to have a supporting material into which the printing material is injected. The supporting material may be liquid, colloid, gel or semi-solid material. A system using this method can be used for example to deposit and cure bioink of mixture of cells, supporting matrix, nutrients to create tissue-like constructs. The bioink for example may be printed into gel poloxamer, which is a biocompatible gel supporting the printing bioink. When the poloxamer gel and other gels are used as supporting material for 3D printing with printing material that is of thermoset monomers or composites with the robocasting technique, the gel may however contaminate the surface of printing layers and the printing layers may therefore not adhere to each other via polymerization, which may cause a weak construct in the printable object. In addition, movement of a printing tip of the robocasting system in the gel may also cause movement of the gel itself which lowers the dimensional accuracy of the printable object. It may also be likely that the printing pressure of the material from the printing tip spreads into the supporting gel before it starts to polymerize.

Thus, it would be beneficial to have a system and/or method to produce printable objects that are well polymerized by thermoset resin robocasting extrusion injection technique which allows good layer-to-layer adhesion, eliminates of oxygen inhibition layer and provides instant initiation of curing of the injectable material and support for the injectable material for high precision printable object. A possibility to add ingredients that may be understood as additives, such as cells, compounds and fillers, to the printable object during the printing process via the supporting material may be a desired property as well.

An exemplary embodiment of a robocasting device comprised in a robocasting system may be understood as a device comprising at least one printing head with a chamber for printing material, an injection tip, or a printing surface platform, which is configured to inject the printing material to a supporting material in which the polymerization of the printing material takes place, a computerized controlling unit for controlling injection parameters of pressure, temperature and viscosity, velocity of movement of the injection tip, or the printing surface platform, in x-y-z direction within the supporting material, light emitting units or microwave radiator to polymerize the printed material in the supporting material and activating the initiator system in the supporting material, and a heating-cooling unit and ultrasound emitting units in the printing chamber, controlling the amount of supporting material and adding or changing the supporting material in the printing process. Such robocasting device may be utilized for printing various objects, for example objects that can be used in tissue engineering scaffolds, surgical implants for hard and soft tissue repairs and replacement, and for dental constructs. For example, in some embodiments, the robocasting device may have an injection tip that has length from the bottom of the chamber to the tip such that it is more than the depth of the supporting material onto which an object is to be printed, and it varies from approximately 1.50 mm to approximately 100.0 mm, although other lengths may also be used depending on for example the object that is to be printed. Additionally, in some example embodiments, the supporting material may be comprised in a container such that the depth of the supporting material is determined based on the size of the object that is to be printed. For example the depth of the supporting material may exceed the height of the object to be printed by approximately 1.0 mm or more.

FIG. 1A illustrates an exemplary embodiment of a system comprising a robocasting device such as the robocasting device described above. Thus, the system may be understood as a robocasting system. In this exemplary embodiment, there is a part of the robocasting device called a printing element, which comprises an injection tip 130 that is configured to move in the directions x, y and z 105 and the movement may be controlled by a controlling unit that is a computerized controlling unit comprising computer instructions configured to control the movement. The printing element also comprises a chamber 170 that may comprise printing material of resin or resin composites. Viscosity of the printing material may be controlled by a thermoelement 120 of the chamber 170. The thermoelement may be comprised in the printing element and may be attached to, or adjacent to, to the chamber 170. In other words, the thermoelement 120 is caused to control the viscosity of the printing material. Dispersion of fillers of the resin or resin composites may be controlled by ultrasound waves from an ultrasound unit 110. The injection tip 130, which moves in supporting material 140, may be of polished steel and may optionally be coated with material like polytetrafluoethylene (teflon) for lowering friction of the tip in the supporting material during the printing movement. The injection tip 130, in this exemplary embodiment, has also a shadow-plate 190 which hinders direct curing light transmission of the upper light emitting sources to cure the printing resin at the tip of the injection tip 130. This eliminates clogging of the injection tip by the cured printing resin. The shadow-plate 190 may be vertically adjustable to control the shadow area i.e. the distance from the injection tip where the injectable resin starts to polymerize. Thus, in general, the shadow plate 190 is placed in the injection tip 130 such that the printing material at the tip of the injection tip 130 is prevented from curing. The supporting material may be comprised in any suitable container such that the printing tip may be allowed to print the printing material into to the supporting material. The supporting material comprised in the container may be understood as a supporting material well 180. It is to be noted that the container may also be called as a printing well. Walls of the well are translucent non-UV protected for curing light transmission. Inner diameter of the injection tip can be between 0.01 to 10.0 mm, for example 0.20 mm for dimethacrylate resin composites. For example, length 1002 of the injection tip from the bottom of the chamber to the tip can be for example from 1.50 mm to 100.0 mm being 1.0 mm more than the depth 1004 of the supporting material. The depth 1004 of the supporting material can be for example at least 1.0 mm more than the height 1006 of the printed object.

The printing material may be biodegradable or biostable resin or resin composite of one of several functional reactive groups comprising polymerizable monomer or co-monomer system with compounds allowing addition or condensation polymerization: free radical polymerization, ionic polymerization, ring opening polymerization or frontal polymerization of the resin or resin composite. After polymerization the resin can be either thermoplastic, thermoset, copolymer, blend or interpenetrating polymer network (IPN) of any kinds. When the printing material is resin composite with particulate or discontinuous fiber fillers, the fillers have less than the inner diameter of the injection tip.

Printing material, that is comprised in the chamber 170, is injected through the injection tip 130 to the bottom of supporting material well 180 and subsequently light-cured by one or more light emitting sources 150 which are located in the injection tip 130 and/or on the sides or the bottom of the supporting material well 180. Light emitting sources at the sides or bottom are used to activate the initiators to form free radicals in the supporting material. Wavelength of the emitting light of the light emitting sources may vary from each other. Polymerization light may be emitted, by the light emitting sources 150, continuously or with pulse at the beginning during or after the printing process.

The supporting material, which is not polymerized by itself, may be Newtonian or non-Newtonian fluid or gel or viscous liquid which supports the injectable material injected using the injection tip 130 before the printing material is initiated for polymerization by the curing light produced by the one or more light emitting sources 150, for example by microwaves or by frontal polymerization mechanisms. When the head of the injection tip is to be kept without curing light radiation, i.e. eliminating clogging of the head, the shadow-plate is adjusted to the correct height up to the distance of the upper light emitting source from the central axis of the injection tip 132. Clogging of injection tip can also be hindered by dipping the injection tip in a mixture of e.g. ethanol-methyl hydroquinone ($C_7H_8O_2$) inhibitor and allow the ethanol to evaporate leaving a coating of inhibitor on the surface of injection tip. If the supporting material is e.g. a gel of non-ionic polyacrylamide (PAM) (($C_3H_5NO)_n$)—water hydrogel (PAH) or methyl cellulose—water hydrogel (MEH), which support the printing material, those having a benefit of allowing printing layers to be adhered together and eliminating or hindering formation of oxygen inhibition layer on the surface of the printed object 160. In the PAH water is bonded between cross-linked polymer PAM by hydrogel bonding. PAH is stable, non-toxic, non-allergenic, non-absorbable and non-biodegradable and therefore especially suitable for being used as supporting material for 3D printing of biomedical and dental constructs. Another hydrogel supporting material of methylcellulose—water hydrogel (MEH) is a biocompatible hydrogel and also suitable bio- and medical device 3D printing. Supporting material can also be mixture of containing hydrogel and additives like emulsion fluid vesicles, cellulose micro fibrils, cellulose nanocrystals, potassium salt, chitosan, alginate, polyvinyl alcohol, starch, gelatine, proteins, or inorganic fillers. Density of additives can be lower, equal or higher than density of the supporting material which influences distribution and vertical location of the additives in the supporting material. The supporting material can be mixed before use for even distribution of fillers or the fillers may be let to fall down or move to the surface of the supporting material. This enables even or gradient location of the fillers in the printed object.

Movement of the injection tip in the supporting material may cause some flow of the supporting material due the shear forces. This can cause inaccuracy to the printable object. Also, when the injection pressure of the printing material that is being injected to the supporting material is high, the printing material may become spread in the supporting material which also reduces dimensional accuracy of the printable object. Therefore, it is desired the curing of the printing material from its surface or through out the material (frontal polymerization) takes place instantly after the printing material has been released from the injection tip to the supporting material. For ensuring instant curing of the printing material once it becomes into contact to the supporting material the supporting material may comprise initiator that is free radical polymerization initiator for activating the reactive groups of the printing material. The initiator in the supporting material for methacrylate based injectable resin material may be for example 2,2'-Azobis(2-methylpropionamidine) dihydrochloride ([=NC(CH$_3$)$_2$C(=NH)NH$_2$]$_2$·2HCl)(AZO chloride) or other water soluble free radical polymerization initiator such as 2,2'-Azobis(2-methylbutylronitrile), 2-hydroxy-1-(4-(2-hydroxyethoxy)phenyl)-2-methyl-1-propanone, monoacylphosphine oxide, bisacylphosphine oxide, 1-hydroxy-cyclohexyl-phenylketone, 2-benzyl-2-dimethylamino-1-(4morpholinophrnyl)-1-butanone, 2-methyl-4'-(methylthio)-2-morpholinopropiophenone, 2,2-dimethoxy-2-phenylacetophenone, eosine-Y, erythrosine, riboflavin (B2) or camphorquinone.

Chemical reaction of 2,2'-Azobis(2-methylpropionamidine) dihydrochloride to alkyl radicals by activation with UV radiation of 330-380 (absorption maximum 375 nm) nanometer wavelength induce nitrogen gas formation to the supporting hydrogel material. Nitrogen gas in the supporting material behaves as protection gas against free radical polymerization inhibition by oxygen which is diffused to hydrogel supporting material and protects free radical from oxidation and prolongs their lifetime. In the printing process to the supporting material with living cells and tissues there may be sources of local oxygen reservoir for cells to survive in the supporting material before being transferred to the printed object.

Biocompatibility of the initiators relates to the initiator compound, concentration of the initiator and exposure to the curing light. Typically curing light at UV wavelengths (350-390 nm) are used in 3D printing. When dental resin composites are cured by light, wave lengths of blue light (460-470 nm) are used with less harmful effects to the cells and tissues. Therefore, it is beneficial to use blue light instead of UV light in curing process of the injectable material for biomedical and dental constructs. Also, to protect the cells in the printing material from the effects of UV radiation, activation of the supporting material is made before injection of the printing material takes place. Living cells are protected by UV protecting fluid vesicles.

For the sake of clarity, it is to be noted that in the present disclosure the when PAM is used in the PAH, the PAM is already cured and no further reactions of the PAH supporting material are intended to take place. The intention of the initiator, such as AZO chloride, is to enhance, accelerate and support free radical polymerization of the printing material when it becomes into contact with the supporting material supporting hydrogel material.

Concentration of PAM in water for the PAH can be between 0.1-20.0 wt % being for example 3.0 wt %. Concentration of methyl cellulose in water (MEH) can be between 0.1-30 wt % being for example 5.0 wt %. For increasing and accelerating the rate of the curing of the injectable methacrylate resin the supporting material may also comprise activator compound which is compatible with the initiator (AZO chloride) of the supporting material. An example of the activator is 2-(Dimethylamino)ethyl acrylate ($H_2C=CHCO_2CH_2CH_2N(CH_3)_2$). Concentration of the initiator AZO chloride in the supporting material PAH can be between 0.2-8.0 being for example 4.0 wt %. Supporting material can also be glycerol gel or highly viscous monomer of bisphenol-A-glycidyl dimethacrylate (bisGMA), urethanedimethacrylate (UDMA), bisphenol-A-ethylmethacrylate (bisEMA) or any other monomer or co-monomer system which is not polymerized by the light from the light emitting sources 150 of the printing device.

It is also possible to add additives such as biologically active compounds, drugs and cells to the supporting material for being transferred to the printed object. Examples of biologically active materials are fluid vesichles, nano- or micrometre scale bioceramic or bioactive glass particles, bone morphogenic growth factors, peptide and RGDs. Also pH controlling compounds may be used as additives, in the supporting material, to optimize the pH to be most suitable for cells and tissue regeneration, and for polymerization of the printed material. An example of pH controlling compound is sol-gel bioactive glass which increases pH by fast dissolution and release of ions for ion exchange reaction. When the printable object, after the printing is completed, is aimed to release the biologically active substances or cells to the tissue engineering environment or in tissues in situ, the printable object is made of biodegradable polymers such as polyesters, poly(lactic acid), poly(caproloactone) or poly (glycolides), their copolymers, IPNs, blends or their composites, or cross-linkable hydrogels. Polymer of the printable object used in applications of this kind are porous which ensures high permeability to nutrients, oxygen and metabolic products. The supporting material is also preferred to be biodegradable and environmental-friendly hydrogels. Biodegradable hydrogels are natural-based hydrogels like polysaccharides (e.g. chitosan) and proteins (e.g. collagen), or synthetic such as poly(lactic acid) (PLA), poly(glycolic acid) (PGA) and polypropylene fumarate (PPF).

The printed object 160 in this exemplary embodiment is a tissue-engineering scaffold or bone anchoring implant like dental implant, soft tissue replacing implant, stent or dental restoration (filling, crown, fixed partial denture, removable denture, orthodontic device, occlusal splint, surgical guide, dental model). The printed object 160 can also be any other object, such as a technical object, which is printed to the supporting material.

Figure 1B:
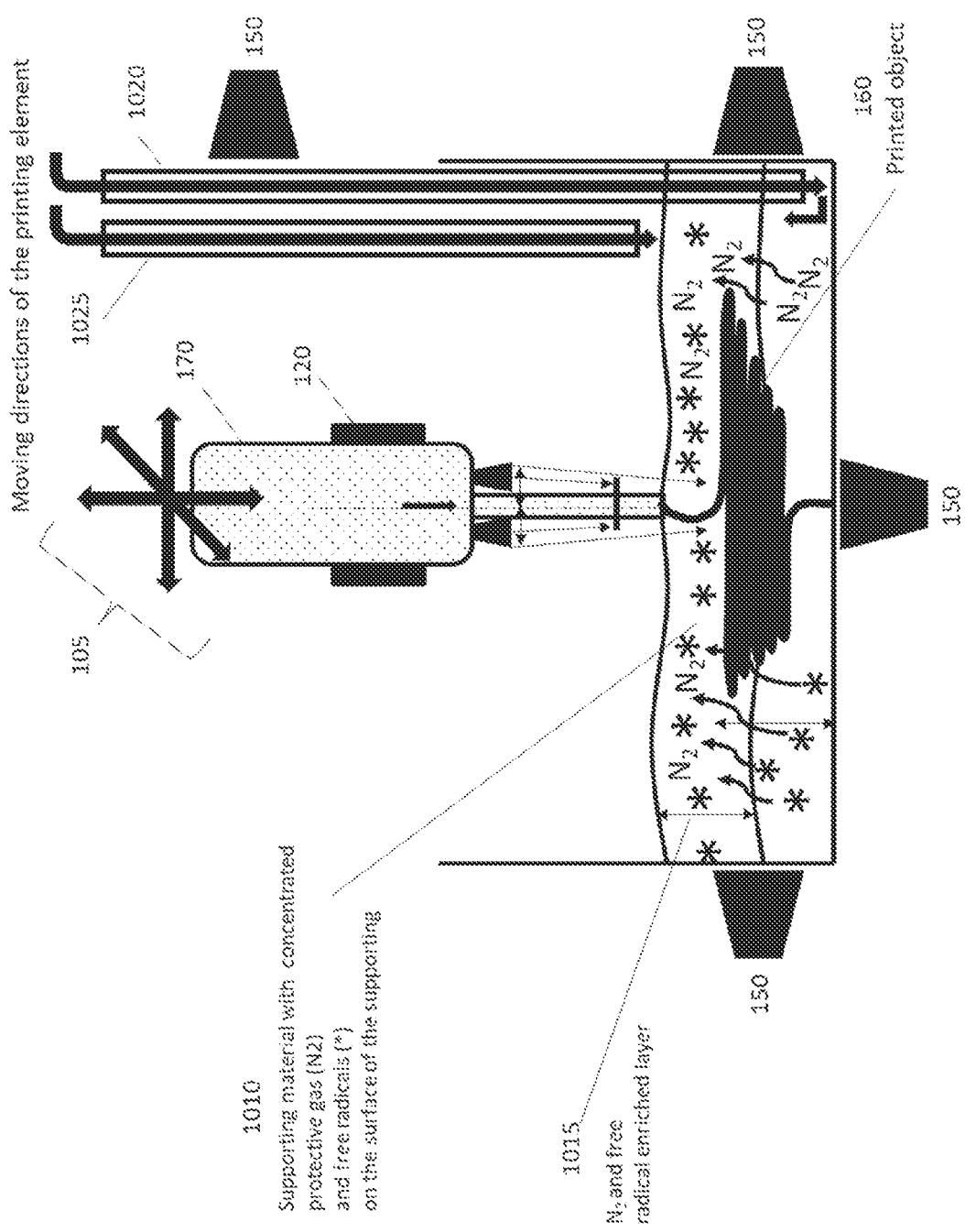
FIG. 1B illustrates formation of protective gas in the supporting material, its concentration to the foamy surface of the supporting material and mechanism to add more supporting material during the vertical y-axis movement of the printing head.

FIG. 1B illustrates another example embodiment which is a variation of the example embodiment illustrated in FIG. 1A. The printing device as such is the same as in the example embodiment of FIG. 1B, but in this this example embodiment, the supporting material 1010 is added to the chamber during the printing. For this purpose, there is an injection tube 1020 that allows the supporting material 1010 to be added to the bottom of the chamber during the printing of the object 160. Additionally, or alternatively, there may additionally be another injection tube 1025 that allows adding supporting material 1010 to the top of the surface of the supporting material. In this example embodiment, the supporting material 1010 is hydrogel material with AZO intiator which is optionally activated with UV radiation coming from the light emitting sources 150 that are located at the sides and/or bottom of the material well. The radiation starts chemical reaction in which alkyl radicals are formed simultaneously with nitrogen ($N_2$) gas formation. Nitrogen is protecting gas in the supporting material to eliminate free radical polymerization inhibition by oxygen of the printing material to take place. Nitrogen gas bubbles are moving upwards and there is a foam-like surface on the supporting materials where the highest amount of protective gas and the highest concentration of alkyl radicals are present. Thus, there may be a top layer in the supporting material that may be understood as a foam layer 1015.

When there are additives in the supporting material, the fluid flow by nitrogen gas upwards moves the additives also to the surface of the supporting material. When printing material reach the foam-layer of supporting material it will instantly polymerize and solidify at least from its surface. This solidification enables printing the material without any solid supporting material underneath of the printing layer. For keeping the printing object all the time inside the foam-layer, volume of the supporting material is increased by sprueing more supporting material to the printing well via a tube. The tube is at least partially translucent which allows additional UV activation of the new supporting material to occur before sprueing out for the end of the tube. It is to be noted that sprueing more supporting material may be understood as providing additional supporting material. Volume increase, i.e. increase the depth of the supporting material in the well is synchronized with the vertical movement of the printing head to keep the printable material inside the foam-layer or on the surface layer of the supporting material if the foam-layer does not exist. Volume increase of the supporting material can be made to the bottom of the well or to the surface of supporting material. Increased supporting material can be without activation or UV- or temperature activated.

Once predetermined stages of the printing have been reached or the complete object has been printed, curing light of 400-480 nm wavelength starts to polymerize the object before its removal from the printing well (container). Thereafter the printed object is washed in water and processed further. The printing process can be made with sterilized printing and supporting materials in a sterile printing device for readily sterile medical device production.

Figure 2:
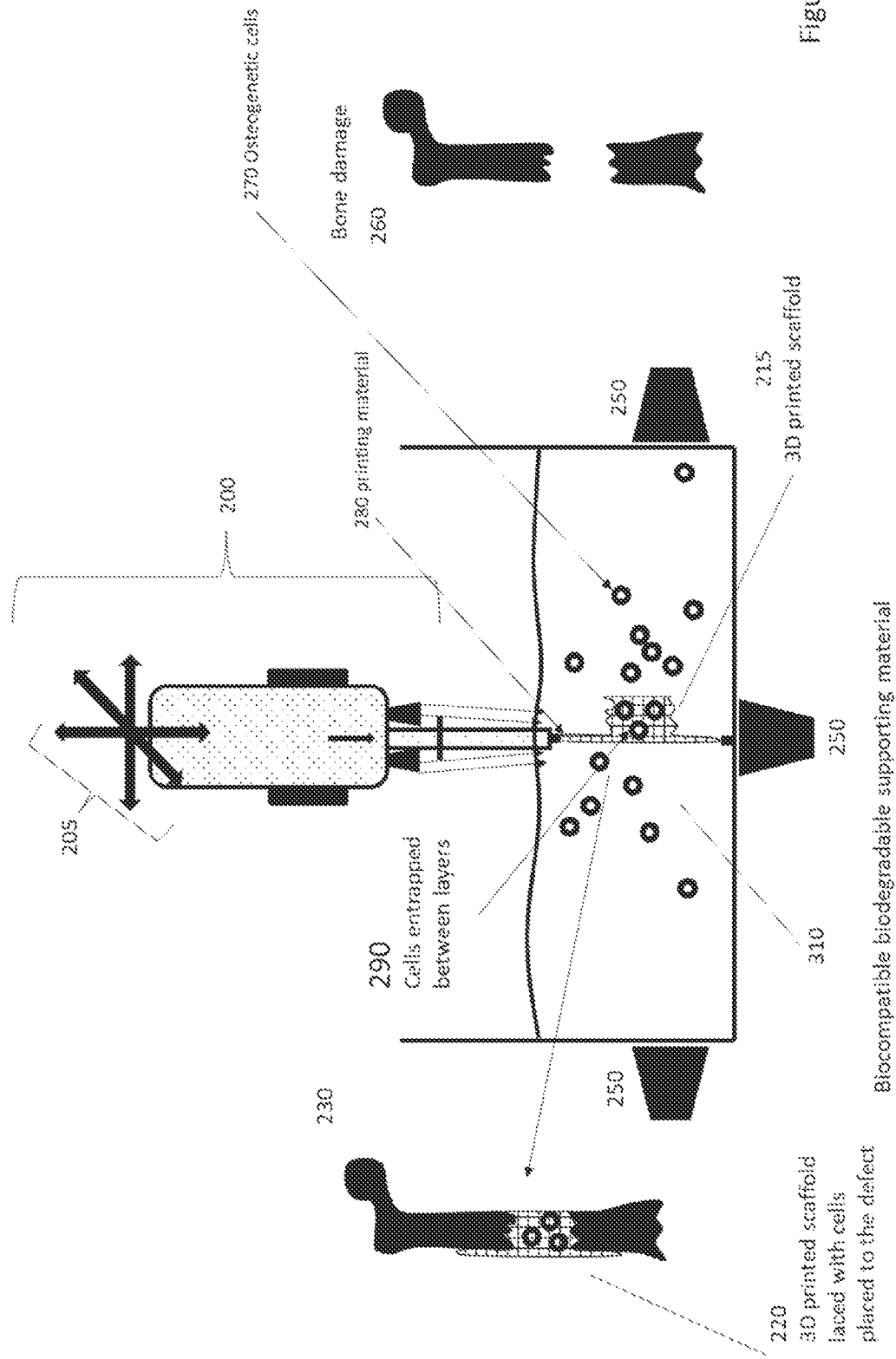
FIG. 2 illustrates the supporting material with additives which will be transferred to the printed object.

FIG. 2 illustrates an exemplary embodiment of a printable object 215 which has been fabricated to the bone defect of long bone 260, which has been damaged. The damaged long bone 260 may have been scanned using computer tomography (CT). Based on the CT scan of the defect, a digital model of the printed object may be produced, using computer software, and the digital model may be used as an input to the printing device that then prints the object based on the received input. In this exemplary embodiment, the printing device is a robocasting printing device such as described in FIG. 1 comprising a printing element 200 that comprises a printing tip that can be controlled to move in directions 205. The printable object is printed onto a container comprising supporting material 210, which in this exemplary embodiment is biodegradable supporting material. In this exemplary embodiment the printable object, after receiving the input comprising printing instructions obtained based on the CT scan, is then be printed in biodegradable chitosan scaffold which comprises mesenchymal stem cells (MSC) 270. Supporting material functions also as cell culturing medium with the ingredients required for cells in this exemplary embodiment. The printing material 280 is in this exemplary embodiment visible blue light polymerizable resin of poly(lactic acid) (PLA) or poly(caprolactone) (PCL) with polymerizable methacrylic groups. MSCs will be trapped to the spaces between the layers 290 of the printing material during printing of the printable object 215. After curing, the scaffold with cells will be cultivated further or directly implanted on the defect site 220 thus promoting bone growth. Additional fixation plates may be used to stabilize the healing bone.

Figure 3:
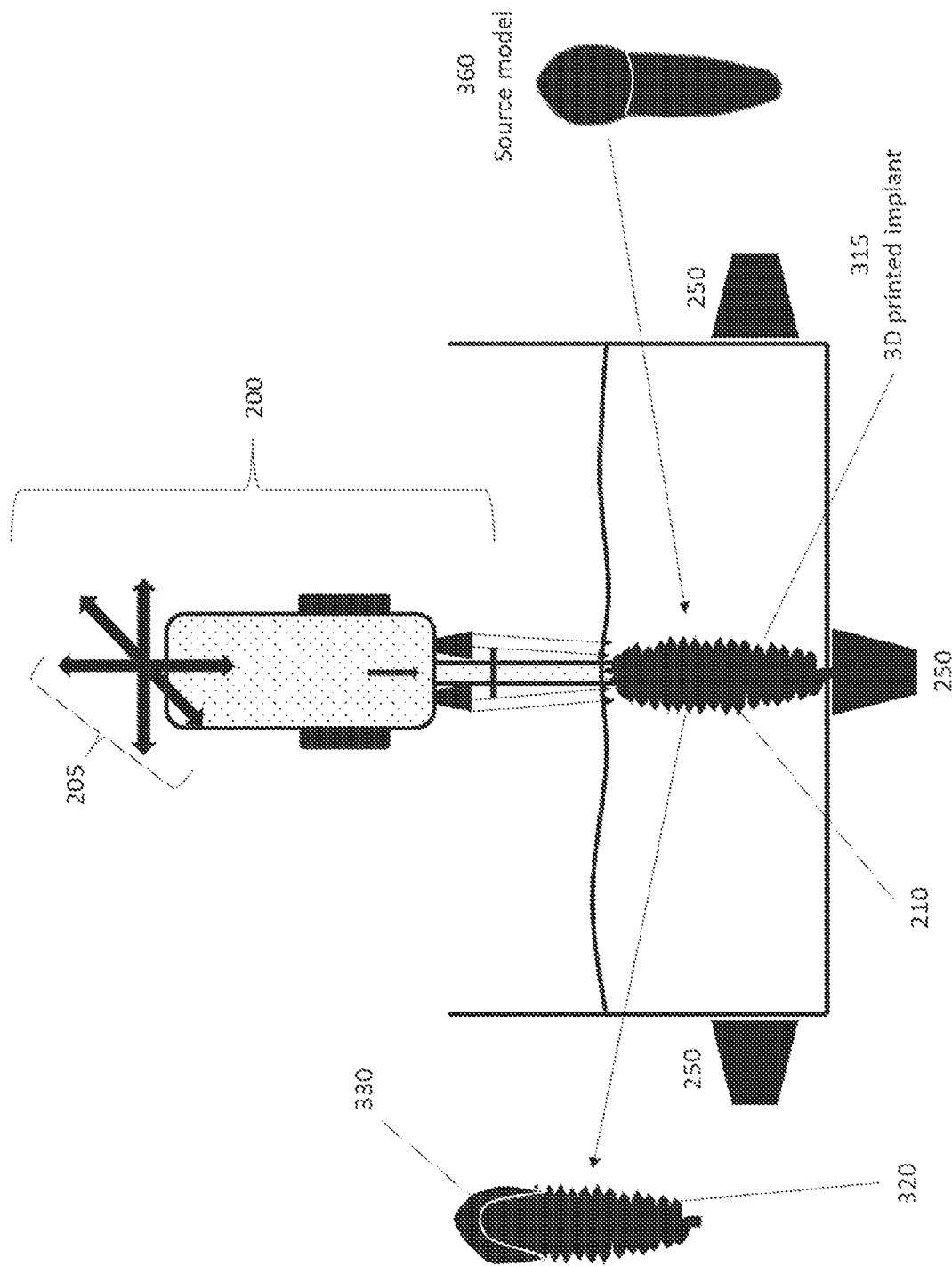
FIGS. 3 and 4 illustrate producing a printable object that can be used as an implant.

FIG. 3 illustrates an exemplary embodiment of printing a printable object into supporting material. The printable object may be any object for which the method of printing an object onto supporting material and then immediately curing it is suitable. Purely for example purposes, in this exemplary embodiment the printable object 315 is an anatomically formed one-piece implant based on a cone-beam computer tomogram image and an stl-file formed based on the computer tomogram image. In this exemplary embodiment, the robocasting system according to the exemplary embodiment of FIG. 1 is utilized and thus there is the printing element 200 that comprises a printing tip that can be controlled to move in directions 205. The scanned anatomy of the root to be extracted is transformed to the 3D printable object, that in this exemplary embodiment is an implant, 315. The surface of the printed object 315 has topography of printing layers 310 which enhance attachment of the implant to the bone by increasing the surface area for osseointegration. After 3D printing the implant 315 and final curing with the additional light emitting sources 250, the finalized object 320, which is the finalized printable object 315 that is extracted from the printing well, is sterilized with autoclave, hot air, critical point carbon dioxide or hydrogen peroxide plasma, implanted to an extraction socket and the object 330 is attached to it. Thus, in this exemplary embodiment, the robocasting system may be utilized to obtain the printable object 315 based on a source model 360 based on which the stl-file, that is used for obtaining the printing instructions.

It is to be noted in general that curing may be performed at multiple occasions using for example an initial curing and final curing. It is also to be noted that there may also be more curing stages and that only a subset or all the light emitting sources may be used at each curing occasion. Thus, at different curing occasions a different combination of light emitting sources may be used.

In some exemplary embodiments, when a printable object is printed using a robocasting system and printing material is printed into supporting material comprising initiator, initial stabilization of the printable object to the bottom of the printing well may be made by a lower curing light emitting source, which may comprise one or more light emitting sources placed below the supporting material well. During printing, the printing material may initially be polymerized with upper curing light emitting sources, which may be light emitting sources placed above the supporting material well. Irradiation power may be for example low irradiation power such as 100 mW/cm$^2$. Final curing of the printing material and thereby of the printable object may be made with all curing light emitting sources and in some example embodiments, all curing light emitting source may also comprise light emitting sources placed on a side of the printing well.

Figure 4:
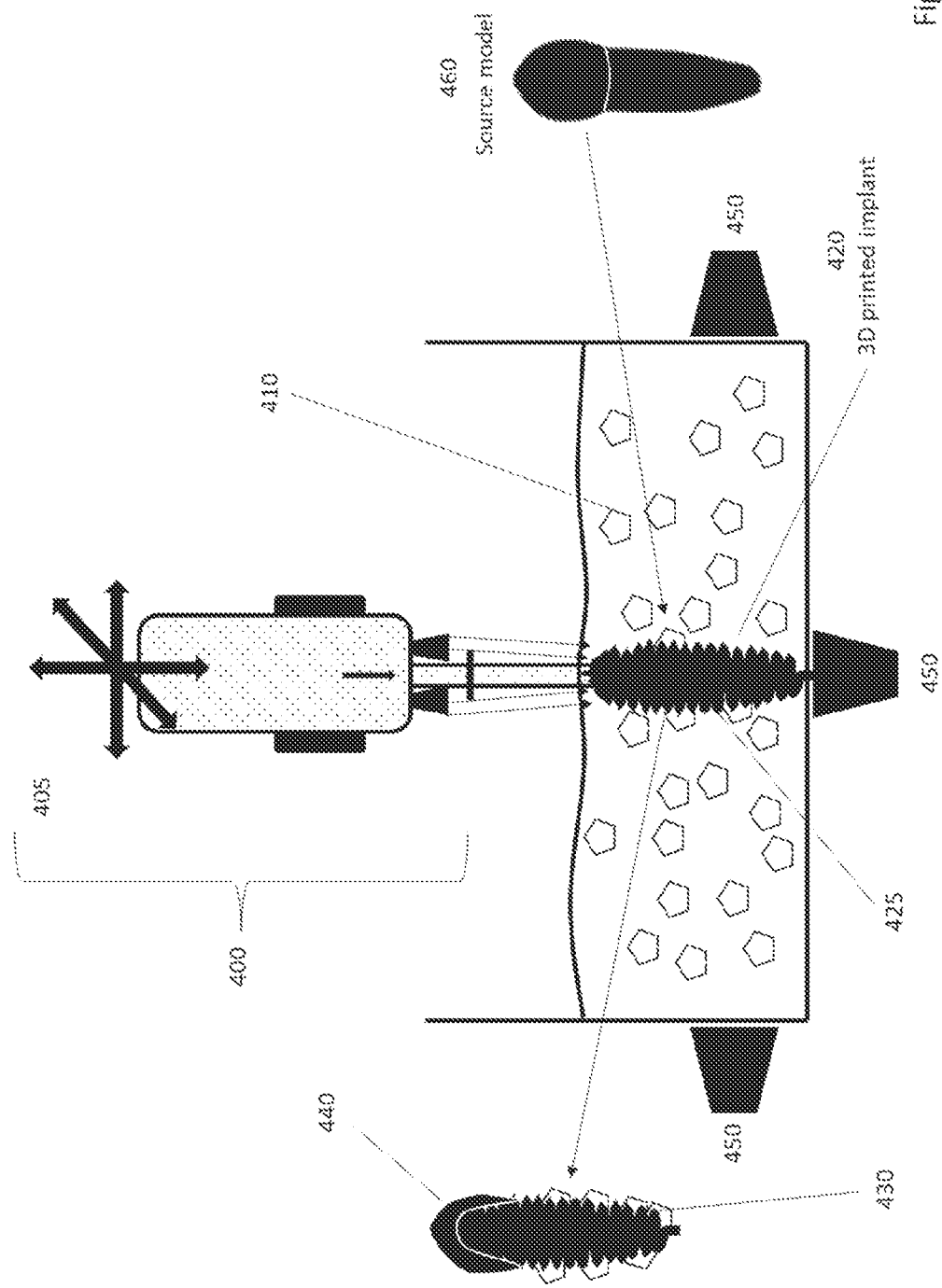

FIG. 4 illustrates another exemplary embodiment in which a robocasting system according to the exemplary embodiment illustrated in FIG. 1 is utilized and thus there is a printing element 400 that is caused to move in the directions 405. In this exemplary embodiment, the robocasting system is utilized to obtain a printed object 440, which is an anatomically formed implant based on the cone-beam computer tomogram image and the formed STL, OBJ, PLY, IGES or STEP files. The printing material is injected to supporting material that comprises in this exemplary embodiment additives that are in this exemplary embodiment bioactive particles 410 that may be of bioactive glass, tricalcium phosphate, hydroxyl apatite, carbonated apatite, calcium carbonate or their combinations of particle size from 0.01 to 1000 micrometers to the supporting material with volume fraction of 2 to 80%. The image obtained is used as an input for printing the printable object 320, which, as mentioned, in this exemplary embodiment is an implant and the surface of the printable object 420 has topography of printing layers 425 which enhances attachment of the implant to the target environment such as bone by increasing the surface area for osseointegration and by help of bioactive particles which will be interlocked to the printing material during polymerization 430. After 3D printing and final curing with the additional light emitting sources 450, the object 440, which is the finalized printable object extracted from the supporting material well, is sterilized with autoclave, hot air, critical point carbon dioxide or hydrogen peroxide plasma, implanted to the extraction socket and attached to the target object 440.

Figure 5:
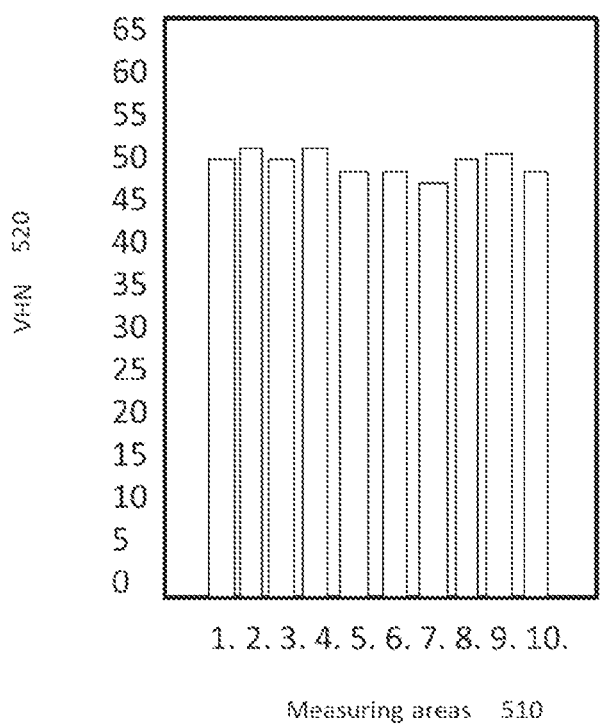
FIG. 5 illustrates a graph regarding example results of good polymerization.

FIG. 5 illustrates a graph regarding example results regarding good polymerization of printing layers to each other when the printing was made in polyacrylamide-water gel. Homogeneity of the printed material was measured as surface microhardness (vickers surface hardness number, VHN) of ground and polished surface of the printed object which has been printed horizontally or vertically in the supporting material. Low standard deviations demonstrate that the surface is well polymerized throughout the surface including printing layer interfaces. In the FIG. 5 the x-axis 510 indicates measuring areas that may be randomly selected measuring areas, and the y-axis 520 indicates VHN.

Figure 6:
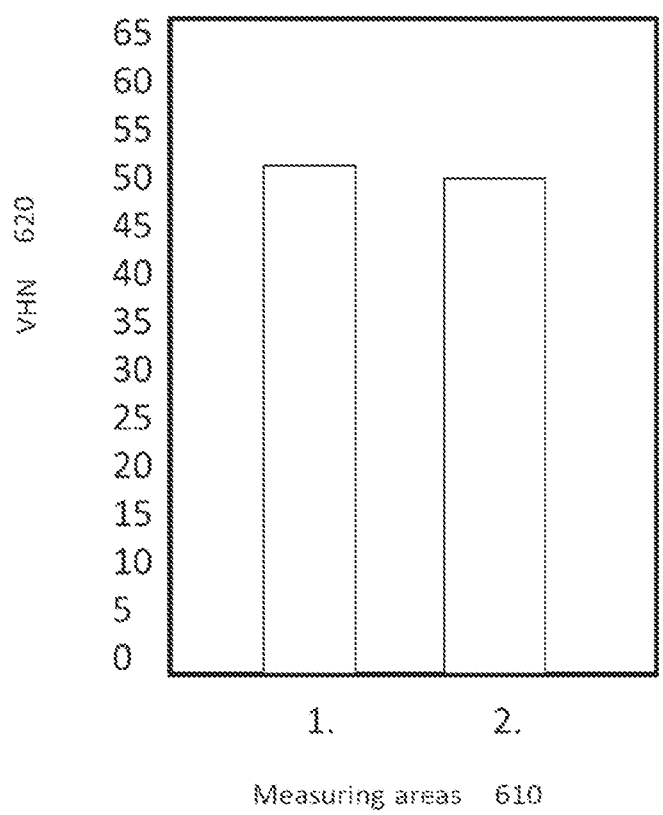
FIG. 6 illustrates surface hardness of the printed object.

FIG. 6 illustrates another graph of example results. In this graph the y-axis 620 indicates VHN and x-axis 610 indicates measuring area. Surface hardness of printed dimethacrylate based resin composite and lack of oxygen inhibition layer on the surface of a printable object when printing material was polymerized in contact to the supporting material and is indicated in bar 1. A comparison was made to surface hardness of ground and polished inner part of the object indicated as bar 2.

Even though the invention has been described above with reference to examples according to the accompanying drawings, it is clear that the invention is not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method for producing a printable object, the method comprising:
    injecting printing material, using a printing element having a printing tip, or a printing surface platform, that is movable, into supporting material comprised in a printing well, wherein the supporting material is liquid or gel and comprises an initiator system;
    providing additional supporting material into the printing well during the printing; and
    curing the injected printing material using at least one light emitting source providing light, that causes activation of the initiator system, and the activated initiator system is for initiating the polymerization of the printing material, wherein the curing is initiated and performed simultaneously with the injecting of the printing material.

2. A method according to claim 1, wherein the activated the initiator system causes formation of free radicals in the supporting material and the free radicals are for activating reactive groups of the printing material.

3. A method according to claim 1, wherein the supporting material comprises a first layer and a second layer and wherein the method comprises injecting the printing material into the first layer of the supporting material.

4. A method according to claim 3, wherein the first layer comprises a higher concentration of gas and a higher concentration of free radicals and surface energy than the second layer.

5. A method according to claim 1, wherein the method further comprises providing the supporting material onto the bottom, or onto a wall of the printing well and/or on top of the supporting material.

6. A method according to claim 1, wherein the method further comprises activating the additional supporting material in a tube before the additional supporting material enters the printing well.

7. A method according to claim 6, wherein the activation of the additional supporting material is performed using UV light, or by using heat, or by using microwaves.

8. A method according to claim 1, wherein the supporting material is Newtonian or non-Newtonian fluid or gel or viscous liquid or a mixture comprising hydrogel and additives, and the supporting material is not cured by the light emitting sources.

9. A method according to claim 1, wherein the injecting is performed layer-by-layer and the curing causes the injected layers to adhere to each other via polymerization.

10. A method according to claim 1, wherein the curing comprises using a plurality of light emitting sources and the plurality of light emitting sources provide light radiation from more than one direction.

11. A method according to claim 1, wherein the printing material is biodegradable or biostable resin or resin composite of one or more functional reactive group containing polymerizable monomer or co-monomer system with compounds allowing polymerization of the resin or resin composite.

12. A method according to claim 1, wherein the supporting material is hydrogel with an AZO initiator, and wherein activating the supporting material using UV light causes a chemical reaction in which radicals are formed simultaneously with protection gas formation.

13. A method according to claim 1, wherein the at least one light emitting source provide polymerization light continuously during the printing or with a pulse at the beginning, during and/or after the printing.

14. A method according to claim 1, wherein the curing uses a plurality of light emitting sources and the plurality of light emitting sources provide light radiation at a plurality of wavelengths.

* * * * *